Figure 1:
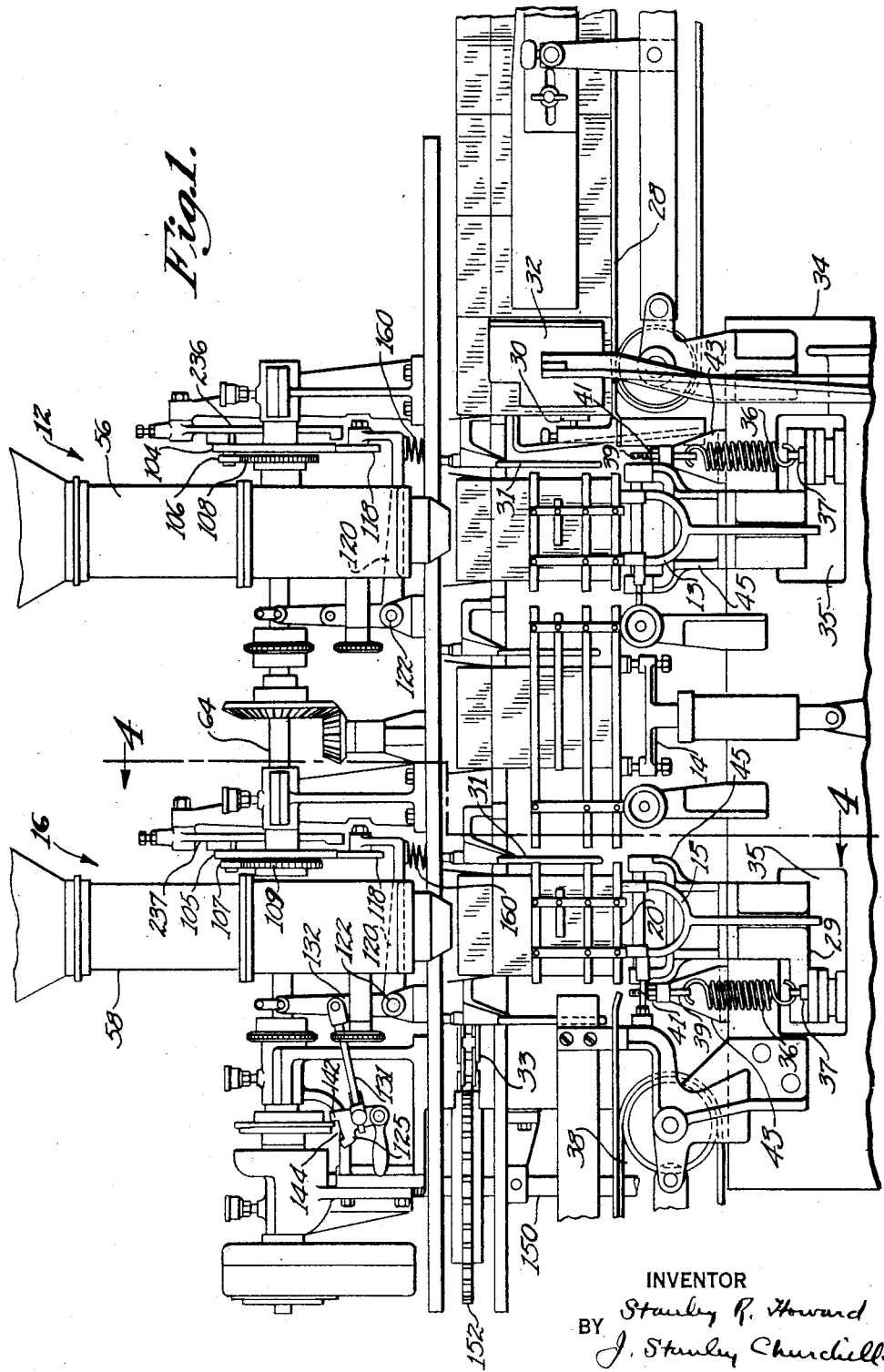

Feb. 21, 1933.    S. R. HOWARD    1,898,539
WEIGHING MACHINE
Filed May 31, 1930    5 Sheets-Sheet 1

INVENTOR
BY Stanley R. Howard
J. Stanley Churchill
ATTORNEY

Feb. 21, 1933.    S. R. HOWARD    1,898,539
WEIGHING MACHINE
Filed May 31, 1930    5 Sheets-Sheet 2

Fig. 2.

INVENTOR
Stanley R. Howard
BY J. Stanley Churchill.
ATTORNEY

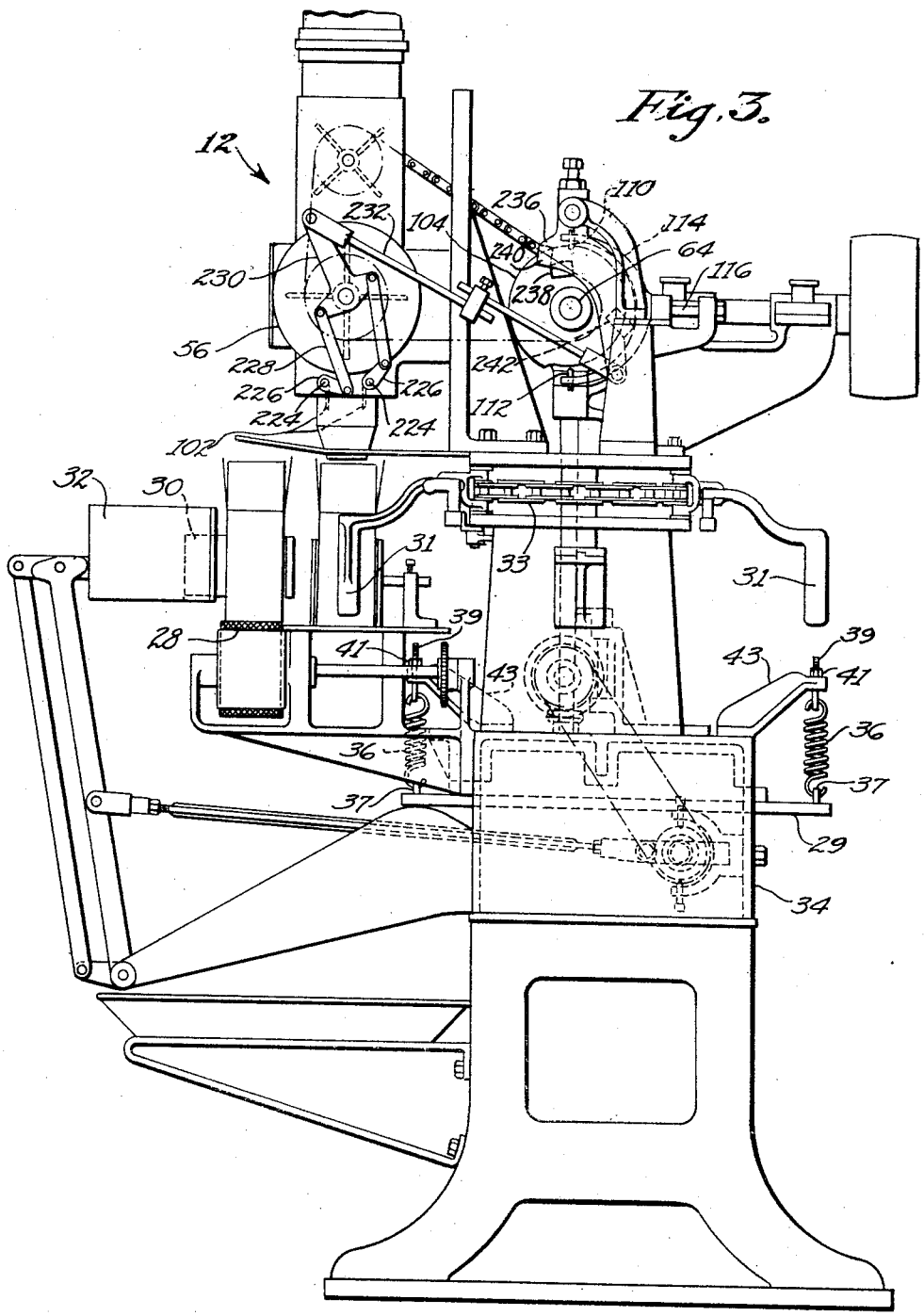

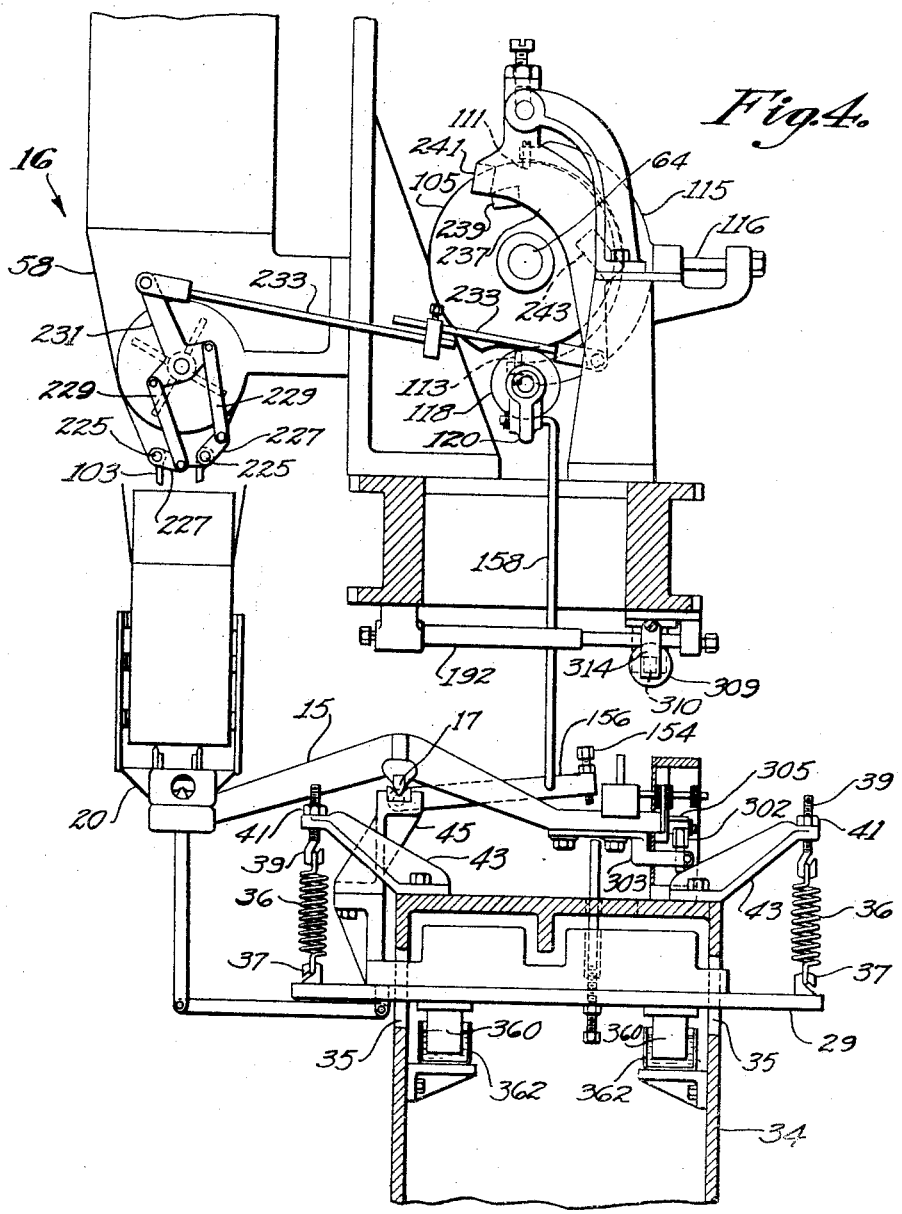

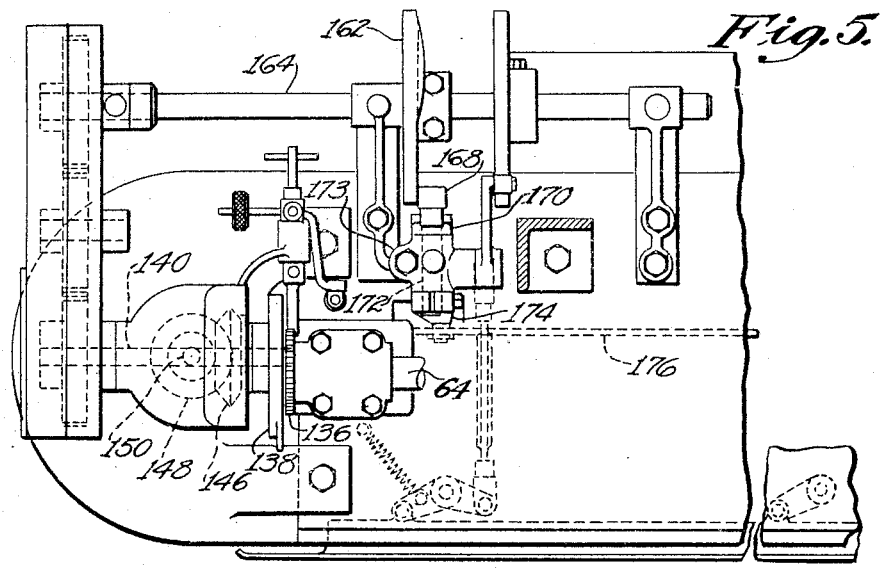
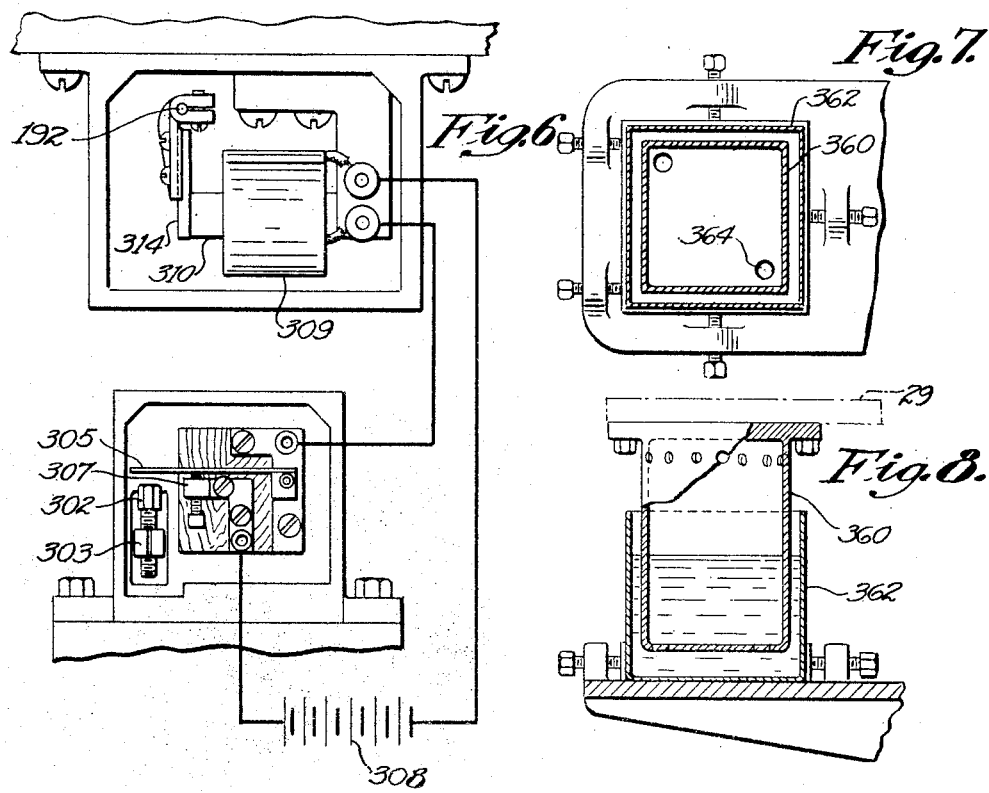

Patented Feb. 21, 1933

1,898,539

UNITED STATES PATENT OFFICE

STANLEY R. HOWARD, OF MILTON, MASSACHUSETTS, ASSIGNOR TO PNEUMATIC SCALE CORPORATION, LIMITED, OF QUINCY, MASSACHUSETTS, A CORPORATION OF MASSACHUSETTS

WEIGHING MACHINE

Application filed May 31, 1930. Serial No. 458,240.

This invention relates to a weighing machine.

The primary object of the invention is to provide a novel and improved weighing machine in which provision is made for minimizing the effect of external vibration upon the scale during the weighing operation to the end that more accurate weights may be obtained than has heretofore been possible with other constructions of weighing machines of which I am aware.

A further and more specific object of the invention is to provide a novel automatic weighing machine having provision for automatically handling and weighing the material to be weighed and in which provision is made for mounting the weighing mechanism in a manner such as to minimize the effect of external vibration upon the weighing operation to the end that more accurate weights may be obtained than has heretofore been possible.

With these objects in view and such others as may hereinafter appear, the invention consists in the machine and in the structures, arrangements and combinations of parts hereinafter described and particularly defined in the claims at the end of this specification.

In the drawings illustrating the preferred embodiment of the invention, Fig. 1 is a front elevation of an automatic weighing machine embodying the present invention; Fig. 2 is a similar view on an enlarged scale illustrating the mechanism for controlling the operation of the weighing machine; Fig. 3 is an end elevation of the weighing machine; Fig. 4 is a vertical sectional view taken on the line 4—4 of Fig. 1; Fig. 5 is a plan view of the left-hand end of the machine; Fig. 6 is a wiring diagram to be referred to; Fig. 7 is a cross-sectional detail illustrating one of the dash pots; Fig. 8 is a detail in vertical section of the dash pot.

In the automatic weighing machines now upon the market, the accuracy with which the weighing operation is performed has been disturbed to a considerable extent by the effect of extraneous vibration or jarring upon the scale beam at or about the time that the weight is being made. In practice automatic weighing machines are used in buildings in which other machinery is in operation, and as a result the building itself usually possesses an inherent vibration which is transmitted through the frame of the weighing machine to the scale beam, disturbing the proper functioning of the same in making the weight, and in addition of course unexpected and incidental disturbances in the immediate vicinity of the machine are similarly transmitted to the scale beam, operating to set it in motion and throwing out the weight by a substantial part of an ounce. This is particularly the case with the high speed automatic weighing machines now extensively employed in the packaging industries.

In accordance with the present invention, provision is made in a weighing machine for operatively supporting the scale beam in such manner that the effect of these extraneous disturbances upon the scale beam during the period that the scale beam in making its weight may be minimized and substantially overcome. In its preferred form the invention contemplates an automatic weighing machine in which the scale beam is operatively supported by a spring connection between it and the supporting frame of the machine, whereby the extraneous vibration and jarring above referred to may be absorbed by the spring, thus protecting the scale beam from the effect of such vibration.

Referring to the drawings, for the purpose of illustrating the invention, an automatic weighing machine of the type known in the art as a two scale weigher is illustrated therein, and which in general may comprise the machine forming the subject matter of the patent to W. S. Scales No. 924,191, June 8, 1909, to which reference may be had for a complete description thereof. For the purposes of the present invention only sufficient portions of the complete weighing machine have been herein illustrated and will be described, as appear to be necessary for a complete understanding of the invention. In general the machine illustrated in the drawings comprises a bulk loading mechanism 12 adapted to deliver into a carton positioned upon a scale beam 13 located immediately beneath it, a bulk load of the material, and provision is made, as will be described, for moving the carton after it has received its bulk load onto an intermediate platform which may be referred to as a tapping mechanism 14 which operates to shake down the bulk load to settle it in the carton, after which the carton is advanced to a scale beam 15 of the final loading mechanism. The final loading mechanism comprises in part a drip hopper 16 which delivers a stream of the material being weighed into the carton which has previously been supplied with the bulk load. When receiving the final load, the carton is positioned upon a scale pan 20 mounted upon the scale beam 15. The empty cartons are fed into the machine by a constantly driven inlet conveyor 28 until the lowermost carton thereon engages a fixed stop 30 and a pusher plate 32 is arranged to thereafter engage the first carton on the inlet conveyor and push it into position where it may be engaged by a pusher arm 31 on an endless driven chain 33 and be moved beneath the bulk loading hopper and upon the scale beam 13. The pusher plate 32 is arranged to operate in timed relation to the series of pusher arms 31 on the conveyor chain 33 to intermittently feed the cartons in succession first to the bulk loading mechanism, then to the tapping mechanism 14, and then onto the scale pan 15 of the final loading mechanism. Finally after the carton has received its final load, it is discharged from the machine upon a discharge conveyor 38.

As illustrated herein, in order to obtain most efficient weighing in which the effect of extraneous vibration and shock upon the accuracy of the weighing is substantially eliminated, both scale beams 13, 15 are mounted upon a platen 29, which is formed separately from the main supporting frame 34 upon which the loading mechanism and other operating parts of the machine are mounted, and as herein shown the platen 29 is arranged to extend through suitable openings 35 in the front and rear of the machine frame 34 to be capable of uninterrupted movement vertically without direct contact with the supporting frame 34. Provision is made for operatively supporting the platen from the frame 34 of the machine by means of springs, and as herein shown the platen 29 is hung upon four springs 36, the lower ends of which hook through holes in ears 37 upstanding from the front and rear portions of the platen, and the upper ends of the springs are hooked through the eyes of bolts 39 adjustably secured by the engagement of nuts 41 on the threaded portions of the bolts with the upper surfaces of brackets 43 through which the bolts are extended. The brackets 43 are secured to the main supporting frame 34 as illustrated in Figs. 1 and 3. Referring now to Figs. 1 and 4, it will be observed that the scale beams 13, 15 are through knife edges 17 pivoted upon scale beam supports 45 mounted upon the platen 29 to move therewith, and with this construction it will be apparent that the scale beam itself is supported in an independent member with respect to the main frame 34 of the machine, and that the vibration which originates either from the operating mechanism of the weighing machine itself in controlling the flow of the goods from the loading mechanism or the vibration which originates outside of the machine and is transmitted to the main frame through the floor, is effectively absorbed by the coil springs, and as a result a minimum amount of vibration is transmitted through the springs to each scale beam, thus reducing to a minimum the effect of such vibration upon the beam and increasing the accuracy with which the machine may weigh. As above stated, in general the construction of the illustrated weighing machine comprises that of the known automatic weighing machine commonly referred to as a two-scale weigher such as is illustrated in the patent to Scales No. 924,191 above referred to. For an understanding of the operation of such weighing machine, it may be stated that the weighing machine operates in successive cycles. During the first part of each cycle in the operation of the machine, the loading, tapping and weighing operations described take place. After the cartons on the scale pans have received their weights, the second part of the cycle is permitted to begin and the feed mechanisms are actuated to advance a carton to the position previously occupied by the preceding one. In other words, a fresh carton is fed into position under the bulk loading mechanism and the carton with its bulk load is fed onto the final weight scale beam and the completely weighed carton is fed onto the discharge conveyor to be discharged from the machine.

The loading and weighing mechanisms used in the illustrated weighing machine will now be described. The bulk loading mechanism, as illustrated in Figs. 1 and 3, operates during the first half of each cycle to deliver a bulk load into the carton positioned upon the scale beam 13. The bulk loading mechanism includes a hopper 56 provided on its lower end with a pair of shutters 102, as shown in Fig. 3, by means of which the flow of material from the hopper is controlled through connections which will be described from the control shaft 64. To this end a cam member 104 is loosely mounted on the shaft 64 and a pawl 106 pivoted on said cam member is normally urged by a spring, not shown, into engagement with a ratchet 108 secured to said control shaft 64, as shown in Fig. 1. The pawl and ratchet 108 comprise a clutch for driving the cam 104 controlling the operation of the gate members or shutters 102 by which the flow of material from the bulk loading hopper 56 is controlled. The pawl 106 is disengaged from the teeth of its ratchet 108 by either of two pins 110, 112, mounted in a yoke 114, the yoke being pivoted upon a shaft 116 secured in a suitable bracket forming a part of the machine frame. The yoke 114 is oscillated, as will be described, in a direction longitudinally of the control shaft 64 to present either the upper or lower pin 110, 112 upon the yoke 114 in the path of the pawl 106 of the pawl and ratchet clutch. When the yoke is rocked counter-clockwise, viewing Fig. 2, to move the upper pin 110 out of the path of the pawl 106, the spring above referred to operates to cause the nose of the pawl 106 to engage the teeth of its ratchet 108 and the ratchet operates to drive, through the pawl 106, the cam disk 104 through one-half a revolution. When the yoke 114 is rocked, as above described, the lower pin 112 of the yoke is positioned in the path of the pawl 106 so that at the end of the half revolution of the cam disk 104, the pawl 106 is disengaged from its ratchet 108 and remains disengaged until the lower pin 112 is again moved out of the path of the pawl when the yoke is rocked in the reverse direction, as will be described.

The usual provision is also preferably made for controlling the machine so that it will not start on the second part of its cycle of operation. When the yoke 104 is rocked in a clockwise direction, viewing Fig. 2, at the completion of the carton feeding operation, as will be described, and the cam disk 104 is thereby permitted to rotate through one-half a revolution, an abutment 238 on the face of the cam disk engages an abutment 240 formed on a rock lever 236 and rocks said lever in a clockwise direction, viewing Fig. 3, to move the shutter 102 into its open position and permit material to be discharged from the hopper 56 into the carton upon the scale beam 13. The connection between the rock lever 236 and the shutter is best illustrated in Fig. 2, and includes a pair of rock shafts 224 journalled in the hopper, arms 226 secured to the shafts 224, links 228, a rock lever 230, and links 232.

When the scale has made its weight, the yoke 114 is rocked in a counter-clockwise direction and the cam disk 104 is permitted to rotate through another half revolution during which the abutment 238 on the disk engages an abutment 242 on the adjacent rock lever 236 and rocks said lever in a counter-clockwise direction, viewing Fig. 3, to thereby close the shutters 102 through the connections described.

The final loading mechanism includes a hopper 58 and the mechanism for controlling the flow of material from the hopper may and preferably will comprise a duplication of the mechanism just described in connection with the bulk loading mechanism and includes, as will be apparent from an inspection of Figs. 2 and 4, a pair of shutters 103, a cam member 105 loosely mounted on the control shaft 64, a pawl 107 pivoted on the cam member arranged to cooperate with a ratchet 109 secured to the control shaft. The pawl is disengaged from the teeth of its ratchet 109 by either of two pins 111, 113, mounted in a yoke 115. When the cam disk 105 is permitted to rotate through one-half a revolution, an abutment 239 engages an abutment 241 on a rock lever 237 and operates to move the shutter 103 into open position. The rock lever 237 is connected with the shutter by a connection including rock shafts 225, arms 227, links 229, a rock lever 231, and links 233. When the scale has made its weight, the yoke 115 is rocked in a counter-clockwise direction and the cam disk 105 is permitted to rotate through another half a revolution during which the abutment 239 on the disk engages an abutment 243 on a rock lever 237 and rocks the lever in a counter-clockwise direction to thereby close the shutters 103 through the connections described.

The usual provision is made for controlling the machine so that it will not start on the second half of its cycle of operations until both scales have completed their weights. For this purpose, each cam disk 104, 105 has cooperating with it a cam roller 118 on the end of an arm 120 pivoted upon a rock shaft 122. Each arm 120 is directly connected to a pawl controlling latch 124, 125, one of the arms 120 being connected to the latch 124 by a link 126, arm 128 and link 130, and the other to the second latch 125 which is directly behind the latch 124 shown in Fig. 2 by an arm 132 and similar link 131. Both pawl controlling latches 124, 125 are arranged to cooperate with a pawl 134 of a pawl and ratchet clutch, the ratchet 136 being fast on the shaft 64, and the pawl 134 being mounted on a pawl carrying disk 138 secured to a separate shaft 140 which is arranged to be driven from the shaft 64 through the pawl and ratchet clutch 134, 136. The pawl controlling latches 124, 125 are each provided with a pawl engaging portion 142 for holding the pawl out of engagement with the ratchet and with a recessed portion 144 adapted to permit the free rotation of the pawl without disengagement from the ratchet. When both pawl engaging latches are swung to the right from the position shown in Fig. 2, the pawl 134 is permitted to engage the ratchet 136 and drive the shaft 140. The latter is connected by beveled gears 146, 148 with a vertical shaft 150 upon which is mounted the sprocket 152 for driving the conveyor chain 33 and consequently the movements of the cartons at the start of the second part of each cycle cannot take place unless the pawl controlling latches 124, 125 are in their inoperative position, or in other words are swung to the right from the position shown in Fig. 2 to permit the pawl 134 to engage the ratchet 136. This condition, as will be described, only obtains when both scale beams have completed their weights and have been reset.

During the portion of each cycle in the operation of the machine in which the cartons are being moved onto the scale pans the scale beams are locked by set screws 154 on levers 156, the latter being held down by the cams 104, 105 through the rollers 118, arms 120, and links 158. After the cartons have been positioned, the set screws 154 and levers 156 are raised by springs 160 under the arms 120 to unlock the scale beams preparatory to the start of the weighing operation. The levers 156 are pivoted upon the supporting bracket 45 carried by the platen and are protected by the resilient springs from extraneous shock and vibration, see Fig. 4.

The yokes 114, 115 are rocked in a clockwise direction by mechanism including a cam 162 on a counter shaft 164 geared to the shaft 140. The cam roller 168 is arranged to cooperate with the cam 162 and is mounted upon the upper arm of a lever 170 secured to a rock shaft 172 journalled in a bracket 173. The lever 174 is also secured to the rock shaft 172 and is pivotally secured at its lower end to a slide bar 176 having two pins 178, 180 projecting therefrom. The pins 178, 180 are adapted when the slide bar is moved in the direction of the arrow (Fig. 2) by the cam 162, to engage levers 186, 188 secured to rock shafts 192, 194 and rock said shafts in a clockwise direction. The levers 198 also secured to the rock shafts 192, 194 are connected by links 204 to the yokes 114, 115. The movement of the yokes 114, 115 in a clockwise direction is effected by the cam 162 but the movement is controlled in the manner above described so that it is not permitted to take place during the previous half cycle of operation.

When the scales have made their weights the scale beams are depressed and provision is made for operatively connecting each scale beam with the corresponding yoke 114, 115 through any usual or preferred form of scale resetting mechanism and which is herein illustrated as including an electro-magnetic device for accomplishing this purpose. When each scale beam makes its weight, a contact member 302 carried by an arm 303 bolted to the underside of the scale beam, as shown in Fig. 4, is brought up against and raises a spring contact 305 operating to break an electrical circuit at the contacts 305, 307. The electrical circuit includes a battery 308 and an electro magnet 309, the core 310 of which is arranged to cooperate with a latch member 314 secured upon and depending from an operating shaft 192 or 194. The operating shaft 192 or 194 has connected to it a spring 319 which tends to rock the shaft 192 or 194 in a direction to pull the latch 314 from the core of the magnet. When, therefore, the scale beam makes its weight and the electrical circuit is broken at the contacts 305, 307, the latch member 314 is released, permitting the shaft 192 or 194 to be rocked by the spring 319 and this movement of the shaft is transmitted in the manner now usually practiced, through the linkage connection 204, to the particular yoke 114, 115.

In order to assist in controlling and stabilizing the movement of the spring hung platen 29, the latter is preferably provided with a plurality of dash pots 360 adapted to fit into receptacles 362 containing oil or other fluid, and communication is established between the dash pots and the receptacles through relatively small openings 364 in the bottom of the dash pot. In this manner the resiliency of the springs 36 is controlled in such manner as to avoid any substantial bouncing action when the machine is subjected to shock or jar.

While the preferred embodiment of the invention has been herein illustrated, and has been embodied in a weighing machine of the two-scale type, it will be understood that the invention may be embodied in other forms, and in weighing machines of other types, within the scope of the following claims.

Having thus described the invention, what is claimed is:—

1. In a weighing machine, in combination, a frame, material delivery means mounted thereon, a scale beam, a supporting member separate from the frame and movable with relation thereto upon which the scale beam is mounted, a spring connection between the supporting member and the frame, and means for stabilizing the movements of the supporting member to prevent oscillation thereof.

2. In a weighing machine, in combination, a frame, material delivery means mounted thereon, a scale beam, a supporting member separate from the frame and movable with relation thereto upon which the scale beam is mounted, a spring connection between the supporting member and the frame, and a dash pot for stabilizing the movements of the supporting member.

3. In an automatic weighing machine, in combination, a main frame adapted to rest upon the floor, a scale supporting platen separate from the main frame, a scale operatively supported upon the scale supporting platen independent of the main frame, relatively short springs for suspending the platen from the frame to reduce to a minimum the transmission of vibration from the frame, and non-resilient stabilizing means cooperating with the platen for preventing oscillation of the platen.

4. In an automatic weighing machine, in combination, a main frame adapted to rest upon the floor, a scale supporting platen separate from the main frame, a scale operatively supported upon the scale supporting platen independent of the main frame, relatively short springs for suspending the platen from the frame to reduce to a minimum the transmission of vibration from the frame, and a dash pot for preventing oscillation of the scale supporting platen.

In testimony whereof I have signed my name to this specification.

STANLEY R. HOWARD.